(12) United States Patent
Chang (10) Patent No.: US 11,073,229 B2
(45) Date of Patent: Jul. 27, 2021

(54) WATER VALVE

(71) Applicant: Chia-Po Chang, Changhua (TW)

(72) Inventor: Chia-Po Chang, Changhua (TW)

( * ) Notice: Subject to any disclaimer, the term of this patent is extended or adjusted under 35 U.S.C. 154(b) by 63 days.

(21) Appl. No.: 16/460,896

(22) Filed: Jul. 2, 2019

(65) Prior Publication Data
US 2020/0132220 A1 Apr. 30, 2020

Related U.S. Application Data

(63) Continuation-in-part of application No. 16/172,802, filed on Oct. 28, 2018, now Pat. No. 10,648,576.

(51) Int. Cl.
*F16K 11/087* (2006.01)
*F16K 39/04* (2006.01)
*F16K 11/078* (2006.01)

(52) U.S. Cl.
CPC ........ *F16K 39/045* (2013.01); *F16K 11/0782* (2013.01); *Y10T 137/86823* (2015.04)

(58) Field of Classification Search
CPC ..... Y10T 137/86831; Y10T 137/86823; Y10T 137/86851; Y10T 137/86815; Y10T 137/86863; F16K 11/0743; G05D 23/1313
See application file for complete search history.

(56) References Cited

U.S. PATENT DOCUMENTS

| 5,896,601 | A | * | 4/1999 | Humpert | |
|---|---|---|---|---|---|
| 6,805,151 | B1 | * | 10/2004 | Chang | |
| 8,109,292 | B2 | * | 2/2012 | Bolgar | F16K 11/0787 137/625.17 |
| 2006/0162793 | A1 | * | 7/2006 | Di Nunzio | F16K 11/0787 137/625.46 |
| 2009/0205717 | A1 | * | 8/2009 | Yuan | F16K 27/045 137/100 |

* cited by examiner

*Primary Examiner* — Robert K Arundale
(74) *Attorney, Agent, or Firm* — Che-Yang Chen; Law Office of Michael Chen (57) ABSTRACT

A water valve may include a valve shell, and a rotating base is installed in the valve shell. A lower end of the rotating base is sequentially connected to a driving valve piece and a fixed valve piece, and the driving valve piece and the fixed valve piece are installed in the valve shell. A bottom portion of the driving valve piece comprises a concave portion to form a mixing chamber, and the mixing chamber has a first mixing space and a second mixing space, and the diameter of the first mixing space is larger than the second mixing space so as to increase the coverage of the mixing chamber. Each of two sides of the second mixing space comprises a pressure relief slot.

5 Claims, 6 Drawing Sheets

WATER VALVE

FIELD OF THE INVENTION

The present invention relates to a water valve and more particularly to a water valve having pressure relief structure.

BACKGROUND OF THE INVENTION

In order to avoid the faucet from having unstable water pressure of cold water inflow or hot water inflow, further causing unstable water temperature, many manufacturers installs a balanced valve in the ceramic control valve of a faucet which comprises a valve core slidably installed in a fixed valve tube. The valve tube has a plurality of sealing gasket disposed thereon, and each of two sides of the valve tube comprises a first recess portion. Moreover, each of two ends of the valve core is concaved inwardly to form a chamber, and a partition is formed between the two chambers. Each of the chambers has a second recess portion formed on a surface thereof so as to enable the valve core to shift with the change of the water pressure from cold water and hot water inflows. Thus, the output from high water pressure end can be reduced to automatically balance the temperature of hot water and cold water.

However, the conventional water valve has following disadvantages: in case that the amount of water coming out from high water pressure end is reduced and a handle of the faucet is not turned to the other direction, the water pressure in the balanced valve may cause that the faucet only can provide small amount of water flow. Also, the rotating angle of the handle of the faucet needs to be large when the water valve needs to relieve pressure, which is inconvenient. Therefore, there remains a need for a new and improved design for a water valve to overcome the problems presented above.

SUMMARY OF THE INVENTION

The present invent provides a water valve which comprises a valve shell, and a rotating base is installed in the valve shell. A lower end of the rotating base is sequentially connected to a driving valve piece and a fixed valve piece, and the driving valve piece and the fixed valve piece are installed in the valve shell. A center of a top portion of the rotating base comprises a valve rod upwardly protruding out of the valve shell. The rotating base is configured to engage with the driving valve piece, and through operating the valve rod, the rotating base driven by the valve rod is adapted to drive and have synchronous rotation with the driving valve piece so as to change the relative positions between the driving valve piece and the fixed valve piece and to control on/off operation of a faucet, ratio of hot water and cold water, and the amount of water flow. A base is coupled with and blocks a bottom portion of the valve shell, thereby securing the fixed valve piece, the driving valve piece, and the rotating base in the valve shell. The base comprises a water inlet chamber, and a balanced valve is installed therein. The valve shell comprises a housing, and an upper portion of the housing is connected to a ring portion which has a first opening at a central portion thereof, and the diameter of the ring portion is smaller than the housing. The rotating base, the driving valve piece, and the fixed valve piece are positioned in the housing of the valve shell, and the valve rod is configured to upwardly protrude out of the valve shell through the first opening. A bottom portion of the driving valve piece comprises a concave portion to form a mixing chamber, and the mixing chamber has a first mixing space and a second mixing space, and the diameter of the first mixing space is larger than the second mixing space so as to increase the coverage of the mixing chamber. Each of two sides of the second mixing space comprises a pressure relief slot. When the driving valve piece is slightly rotated in one direction or the other direction, the pressure relief slot is communicated with a cold water hole or a hot water hole of the fixed valve piece so as to relieve pressure in the balanced valve which is installed in the base.

The fixed valve piece comprises the arc-shaped cold water hole and the arc-shaped hot water hole which axially penetrate through the fixed valve piece respectively and are formed symmetrically. A first water outlet hole and a second water outlet hole respectively and vertically penetrate through the fixed valve piece between the cold water hole and the hot water hole, and the first water outlet hole and the second water outlet hole are spaced apart toward two lateral sides of the cold water hole and the hot water hole. The base has a water inlet chamber and two water outlet chambers, which are formed separately in the base. A first cold water inlet and a first hot water inlet, which are formed separately, are respectively connected at an upper end of the water inlet chamber and vertically penetrate the base. The two water outlet chambers, which are respectively formed at two sides of the water inlet chamber, are respectively connected to a first drain and a second drain at upper ends thereof, and the first drain and the second drain respectively and vertically penetrate through the base. The rotating base, the driving valve piece, and the fixed valve piece in the housing are stacked in sequence, and the base is connected to the valve shell so as to load the fixed valve piece, the driving valve piece, and the rotating base. The fixed valve piece is engaged with a top surface of the base, and the first cold water inlet, the first hot water inlet, the first drain, and the second drain of the base are respectively aligned with the cold water hole, the hot water hole, the first water outlet hole, and the second water outlet hole of the fixed valve piece. Before the valve rod is operated, the mixing chamber of the driving valve piece is misaligned with the hot water hole, the first water outlet hole, and the second water outlet hole of the fixed valve piece such that cold water and hot water are blocked by the driving valve piece and not flow out from the water valve. The balanced valve comprises two halves of cases, and the two cases are configured to fit together to accommodate a fixed valve pipe and a valve core therebetween. Each of the cases has a horizontal through hole formed at a lateral surface thereof, and the two through holes are faced to each other. Each of the cases comprises a water passage penetrating from a top surface to a bottom surface of the case and communicated with the through hole. The two through holes are adapted to enable the fixed valve pipe and the valve core to be accommodated in the cases when the two halves of cases are fitted together. The balanced valve is positioned in the water inlet chamber of the base to secure the fixed valve pipe in the cases, and the two water passages of the two cases are respectively aligned with the first cold water inlet and the first hot water inlet of the base. The fixed valve pipe has an O-ring disposed thereon, and each of two lateral sides of the fixed valve pipe comprises a first recess section. Each of two ends of the valve core is concaved inwardly to form a valve room, and the two valve rooms are separated by a partition. Each of the two valve rooms has a second recess section formed on a surface thereof to enable the valve core to move in the fixed valve pipe along with the water pressure occurred by cold water inflow and hot water inflow, so as to change the relative position between the first recess section and the second recess section, thereby automatically balancing the water pressure in the water valve.

Comparing with conventional water valve, the present invention is advantageous because: when the water pressure in the balanced valve causes that the shunt valve only can provide small amount of water flow, a user can keep rotating the handle in the direction slightly, and a small amount of water at low pressure end in the water valve is conducted through the pressure relief slot into the mixing chamber and comes out of the water valve together with the original water flow, which can avoid the unstable amount and temperature of water outflow and also can effectively relieve the pressure in the balanced valve when hot water or cold water is used.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 5, the present invention provides a water valve which comprises a valve shell (10), and a rotating base (20) is installed in the valve shell (10). A lower end of the rotating base (20) is sequentially connected to a driving valve piece (30) and a fixed valve piece (40), and the driving valve piece (30) and the fixed valve piece (40) are installed in the valve shell (10). A center of a top portion of the rotating base (20) comprises a valve rod (21) upwardly protruding out of the valve shell (10). The rotating base (20) is configured to engage with the driving valve piece (30), and through operating the valve rod (21), the rotating base (20) driven by the valve rod (21) is adapted to drive and have synchronous rotation with the driving valve piece (30) so as to change the relative positions between the driving valve piece (30) and the fixed valve piece (40) and to control on/off operation of a faucet, ratio of hot water and cold water and the amount of water flow. A base (50) is coupled with and blocks a bottom portion of the valve shell (10), thereby securing the fixed valve piece (40), the driving valve piece (30) and the rotating base (20) in the valve shell (10). The base (50) comprises a water inlet chamber (51), and a balanced valve (60) is installed therein. The valve shell (10) comprises a housing (11), and an upper portion of the housing (11) is connected to a ring portion (12) which has a first opening (13) at a central portion thereof, and the diameter of the ring portion (12) is smaller than the housing (11). The rotating base (20), the driving valve piece (30), and the fixed valve piece (40) are positioned in the housing (11) of the valve shell (10), and the valve rod (21) is configured to upwardly protrude out of the valve shell (10) through the first opening (13). A bottom portion of the driving valve piece (30) comprises a concave portion to form a mixing chamber (31), and the mixing chamber (31) has a first mixing space (32) and a second mixing space (33), and the diameter of the first mixing space (32) is larger than the second mixing space (33). The first mixing space (32) is adapted to increase the coverage of the mixing chamber (31). Each of two sides of the second mixing space (33) comprises a pressure relief slot (34). When the driving valve piece (30) is slightly rotated in one direction or the other direction, the pressure relief slot (34) is communicated with a cold water hole (41) or a hot water hole (42) of the fixed valve piece (40) so as to relieve pressure in the balanced valve (60) which is installed in the base (50).

Figure 1:
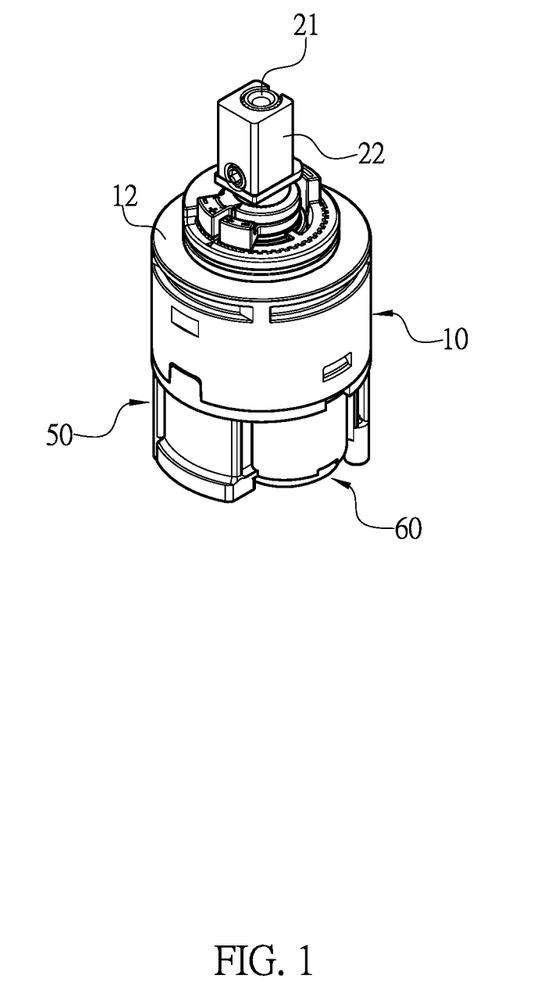
FIG. 1 is a three-dimensional assembly view of a water valve of the present invention.
Figure 2:
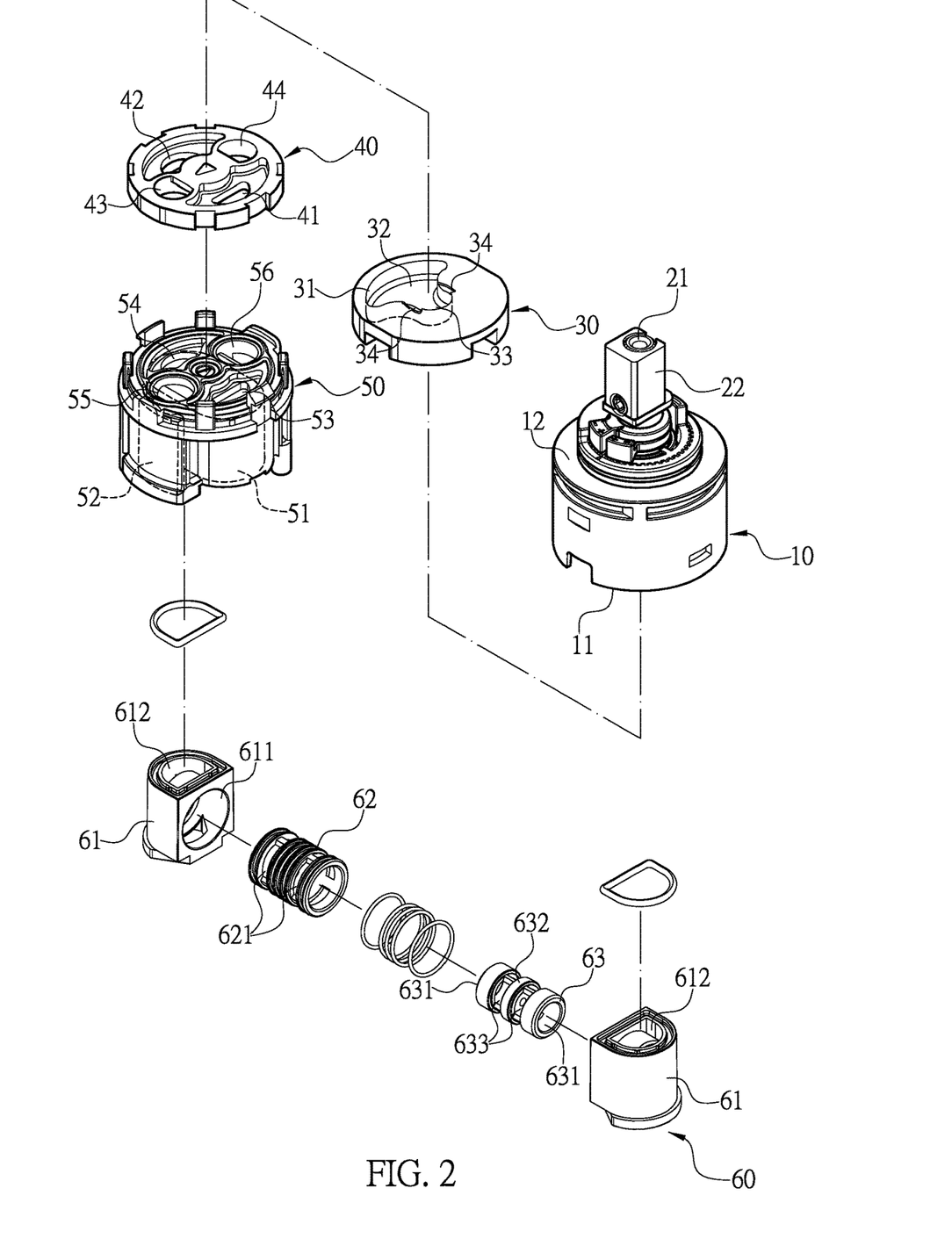
FIG. 2 is a three-dimensional exploded view of the water valve of the present invention.
Figure 3:
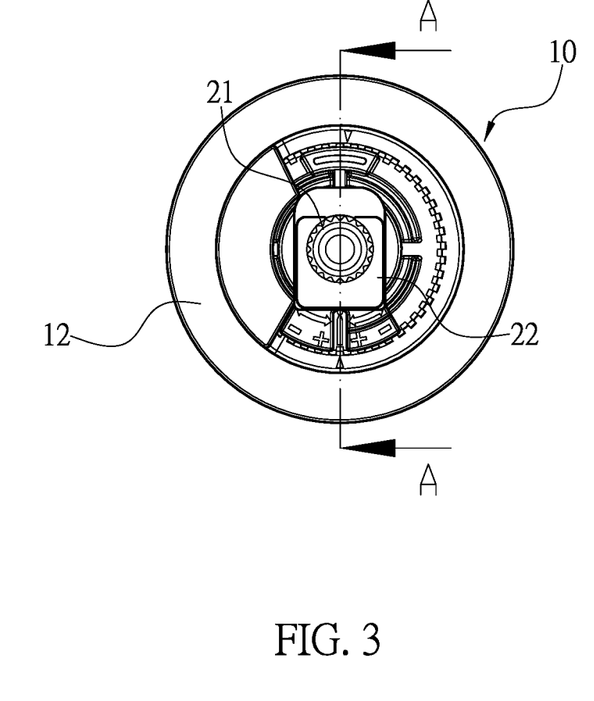
FIG. 3 is a plan assembly view of the water valve of the present invention.
Figure 4:
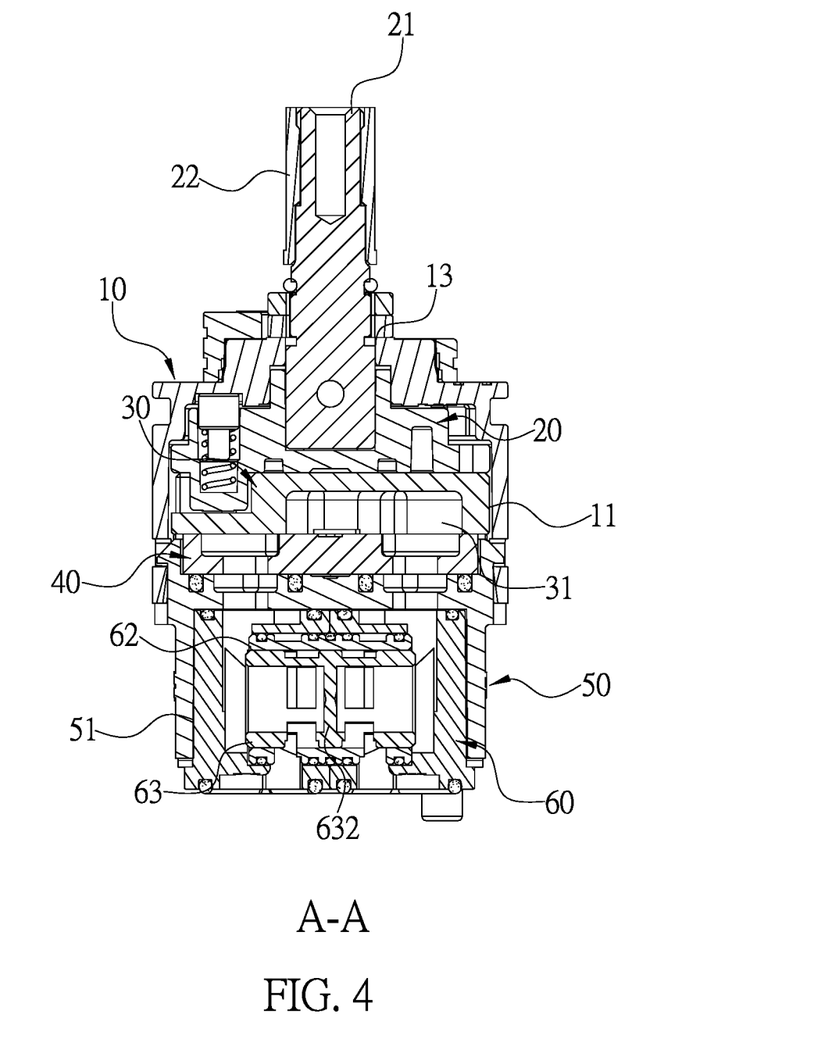
FIG. 4 is a sectional view of FIG. 3 along line A-A.
Figure 5:
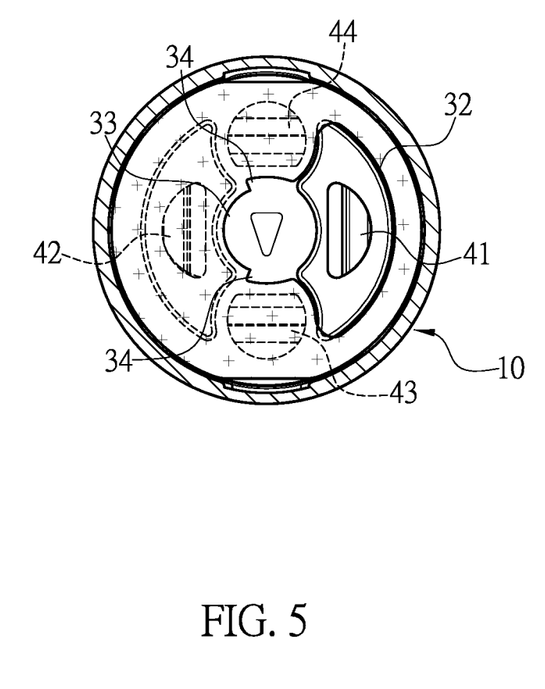
FIG. 5 is a schematic view of the relative position between a driving valve piece and a fixed valve piece when the water valve of the present invention is turned off.

The fixed valve piece (40) comprises the arc-shaped cold water hole (41) and the arc-shaped hot water hole (42) respectively and vertically penetrating through the fixed valve piece (40), and the cold water hole (41) and the hot water hole (42) are formed symmetrically on the fixed valve piece (40). A first water outlet hole (43) and a second water outlet hole (44) respectively and vertically penetrate through the fixed valve piece (40) between the cold water hole (41) and the hot water hole (42), and the first water outlet hole (43) and the second water outlet hole (44) are spaced apart toward two lateral sides of the cold water hole (41) and the hot water hole (42). The base (50) has a water inlet chamber (51) and two water outlet chambers (52) which are formed separately in the base (50). A first cold water inlet (53) and a first hot water inlet (54), which are formed separately, are respectively connected at an upper end of the water inlet chamber (51) and vertically penetrate the base (50). The two water outlet chambers (52) are respectively formed at two sides of the water inlet chamber (51), and the two water outlet chambers (52) are respectively connected to a first drain (55) and a second drain (56) at upper ends thereof, and the first drain (55) and the second drain (56) respectively and vertically penetrate through the base (50). The rotating base (20), the driving valve piece (30) and the fixed valve piece (40) in the housing (11) are stacked in sequence, and the base (50) is connected to the valve shell (10) so as to load the fixed valve piece (40), the driving valve piece (30), and the rotating base (20). Also, the fixed valve piece (40) is engaged with a top surface of the base (50), and the first cold water inlet (53), the first hot water inlet (54), the first drain (55), and the second drain (56) of the base (50) are respectively aligned with the cold water hole (41), the hot water hole (42), the first water outlet hole (43), and the second water outlet hole (44) of the fixed valve piece (40). Before the valve rod (21) is operated, the mixing chamber (31) of the driving valve piece (30) is misaligned with the hot water hole (42), the first water outlet hole (43), and the second water outlet hole (44) of the fixed valve piece (40) such that cold water and hot water are blocked by the driving valve piece (30) and not flow out from the water valve of the present invention. The balanced valve (60) comprises two halves of cases (61), and the two cases (61) are configured to fit together to accommodate a fixed valve pipe (62) and a valve core (63) therebetween. Each of the cases (61) has a horizontal through hole (611) formed at a lateral surface thereof, and the two through holes (611) are faced to each other. Moreover, each of the cases (61) comprises a water passage (612) penetrating from a top surface to a bottom surface of the case (61) and communicated with the through hole (611). The two through holes (611) are adapted to enable the fixed valve pipe (62) and the valve core (63) to be accommodated in the cases (61) when the two halves of cases (61) are fitted together. Thereafter, the balanced valve (60) is positioned in the water inlet chamber (51) of the base (50) to secure the fixed valve pipe (62) in the cases (61), and the two water passages (612) of the two cases (61) are respectively aligned with the first cold water inlet (53) and the first hot water inlet (54) of the base (50). The fixed valve pipe (62) has an O-ring disposed thereon, and each of two lateral sides of the fixed valve pipe (62) comprises a first recess section (621). Each of two ends of the valve core (63) is concaved inwardly to form a valve room (631), and the two valve rooms (631) are separated by a partition (632). Each of the two valve rooms (631) has a second recess section (633) formed on a surface thereof to enable the valve core (63) to move in the fixed valve pipe (62) along with the water pressure occurred by cold water inflow and hot water inflow, so as to change the relative position between the first recess section (621) and the second recess section (633), thereby automatically balancing the water pressure in the water valve.

In one embodiment, the water valve comprises a temperature control unit which is adapted to limit the rotating angle of the valve rod (21).

Figure 6:
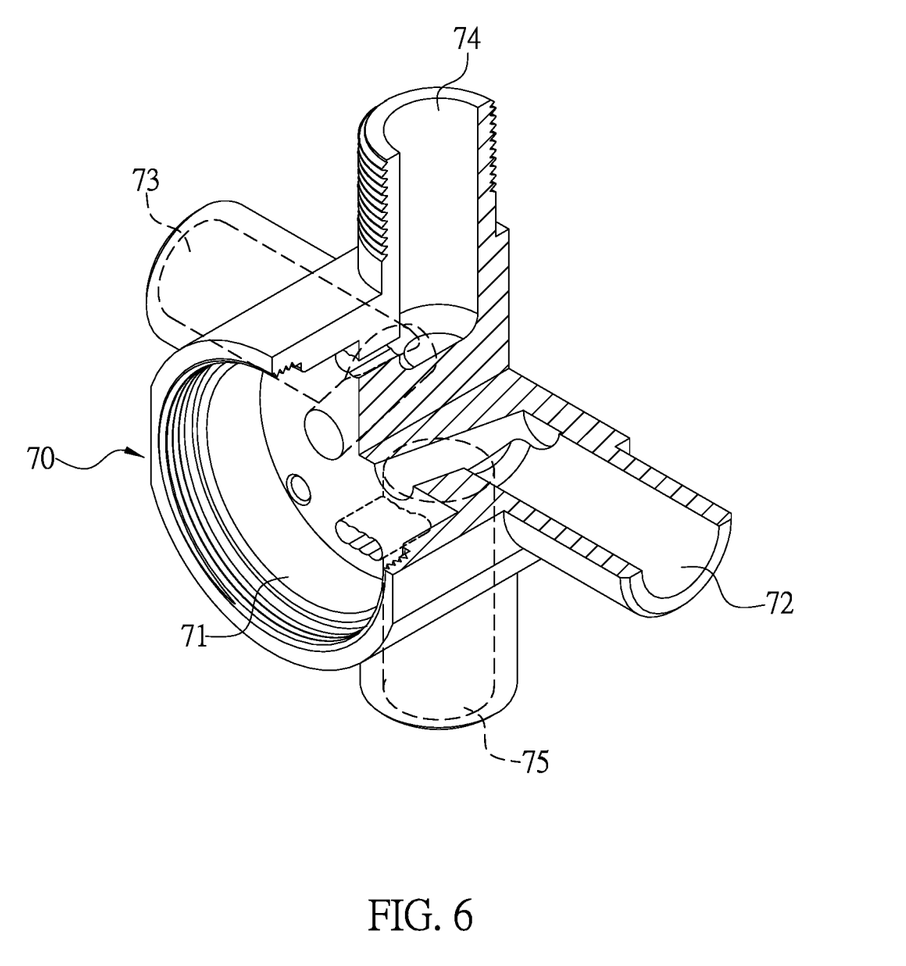
FIG. 6 is a three-dimensional view of a shunt valve of the water valve of the present invention.

In another embodiment, the water valve of the present invention is positioned in a valve chamber (71) of a shunt valve (70) for use, and the shunt valve (70) comprises a second cold water inlet (72), a second hot water inlet (73), a first water channel (74), and a second water channel (75) respectively penetrating through a bottom portion of the valve chamber (71) (as shown in FIG. 6); the second cold water inlet (72) and the second hot water inlet (73) are respectively connected to cold water source and hot water source, and the first water channel (74) and the second water channel (75) are respectively connected to two water equipments, such that through operating the water valve of the present invention, cold water, hot water, or warm water mixed from cold water and hot water is configured to flow through one of the water equipments.

In still another embodiment, the shunt valve (70) is a four-way valve.

In a further embodiment, the shunt valve (70) is embedded in a wall, and a first water channel (74) is connected to a first water equipment and a second water channel (75) is connected to a second water equipment, wherein the first water equipment is a shower head fixed on the wall, and the second water equipment is a faucet located under the shower head.

In still a further embodiment, a detachable adapter (22) is connected to the valve rod (21), and through the adapter (22), the valve rod (21) is configured to connect to different types of handles.

In still a particular embodiment, the pressure relief slot (34) is formed in a triangle shape.

Figure 7:
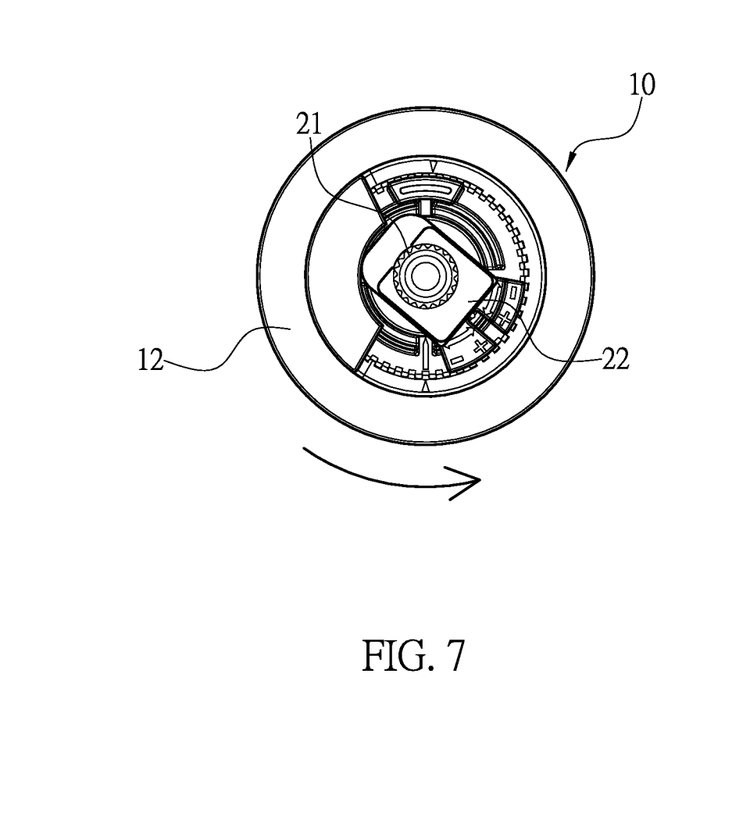
FIG. 7 is a schematic view illustrating the valve rod is rotated to relieve the water pressure in the water valve.
Figure 8:
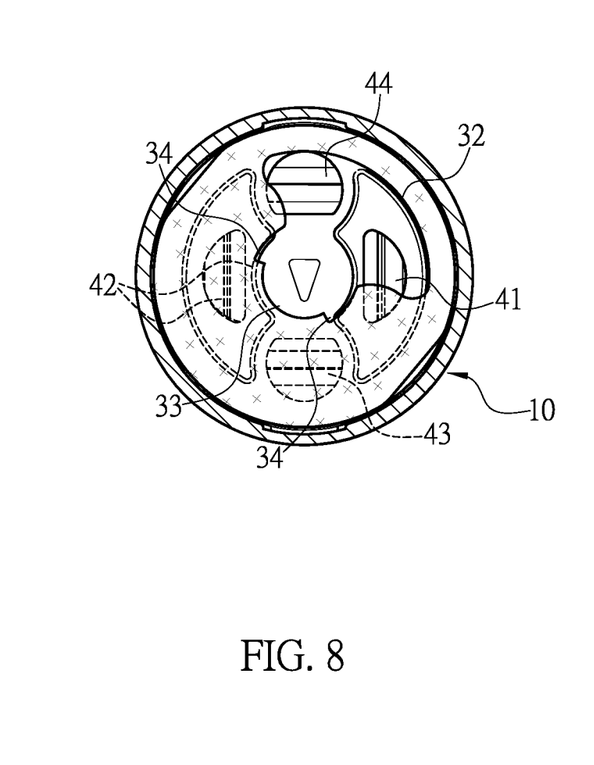
FIG. 8 is a schematic view of the relative position between the driving valve piece and the fixed valve piece when the valve rod is rotated to relieve the water pressure in the water valve.

In actual application, the water valve of the present invention is installed in the valve chamber (71) of the shunt valve (70) and is connected to a handle through the valve rod (21). Through operating the handle, a user can select one of the two water equipments for use through the shunt valve (70), and also can adjust mixing ratio of hot water and cold water when using. With the balanced valve (60), the valve core (63) is configured to move in the fixed valve pipe (62) along with the water pressure occurred by cold water inflow and hot water inflow to reduce the amount of water coming out from the high pressure end, thereby automatically balancing the water pressure in the water valve. Also, when the water pressure in the balanced valve (60) causes that the shunt valve (70) only can provide small amount of water flow, a user can keep rotating the handle in the direction slightly, and a small amount of water at low pressure end in the water valve is conducted through the pressure relief slot (34) into the mixing chamber (31) (as shown in FIGS. 7 and 8) and comes out of the water valve together with the original water flow, which can avoid the unstable amount and temperature of water outflow and also can effectively relieve the pressure in the balanced valve (60) when hot water or cold water is used.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water valve comprising a valve shell, and a rotating base installed in the valve shell; a lower end of the rotating base sequentially connected to a driving valve piece and a fixed valve piece, and the driving valve piece and the fixed valve piece installed in the valve shell; a center of a top portion of the rotating base comprising a valve rod upwardly protruding out of the valve shell; the rotating base configured to engage with the driving valve piece, and through operating the valve rod, the rotating base, which is driven by the valve rod, adapted to drive and have synchronous rotation with the driving valve piece so as to change the relative positions between the driving valve piece and the fixed valve piece and to control on/off operation of a faucet, ratio of hot water and cold water, and the amount of water flow; a base coupled with and blocking a bottom portion of the valve shell to secure the fixed valve piece, the driving valve piece, and the rotating base in the valve shell; the base comprising a water inlet chamber, and a balanced valve installed therein;

wherein the valve shell comprises a housing, and an upper portion of the housing is connected to a ring portion which has a first opening at a central portion thereof, and a diameter of the ring portion is smaller than the housing; the rotating base, the driving valve piece, and the fixed valve piece are positioned in the housing of the valve shell, and the valve rod is configured to upwardly protrude out of the valve shell through the first opening;

wherein a bottom portion of the driving valve piece comprises a concave portion to form a mixing chamber, and the mixing chamber has a first mixing space and a second mixing space, and a diameter of the first mixing space is larger than a diameter of the second mixing space so as to increase the coverage of the mixing chamber; the second mixing space has two opposing ends, and each end comprises a pressure relief slot; when the driving valve piece is rotated in one direction or the other direction, the pressure relief slot is communicated with a cold water hole or a hot water hole of the fixed valve piece so as to relieve pressure in the balanced valve which is installed in the base;

wherein the fixed valve piece comprises an arc-shaped cold water hole and an arc-shaped hot water hole which axially penetrate through the fixed valve piece respectively and are formed symmetrically; a first water outlet hole and a second water outlet hole respectively and vertically penetrate through the fixed valve piece between the cold water hole and the hot water hole, and the first water outlet hole and the second water outlet hole are spaced apart toward two lateral sides of the cold water hole and the hot water hole;

wherein the base has the water inlet chamber and two water outlet chambers, which are formed separately in the base; a first cold water inlet and a first hot water inlet, which are formed separately, are respectively connected at an upper end of the water inlet chamber and vertically penetrate the base; the two water outlet chambers, which are respectively formed at two sides of the water inlet chamber, are respectively connected to a first drain and a second drain at upper ends thereof, and the first drain and the second drain respectively and vertically penetrate through the base; the rotating base, the driving valve piece, and the fixed valve piece in the housing are stacked in sequence, and the base is connected to the valve shell so as to load the fixed valve piece, the driving valve piece, and the rotating base; the fixed valve piece is engaged with a top surface of the base, and the first cold water inlet, the first hot water inlet, the first drain, and the second drain of the base are respectively aligned with the cold water hole, the hot water hole, the first water outlet hole, and the second water outlet hole of the fixed valve piece; before the valve rod is operated, the mixing chamber of the driving valve piece is misaligned with the hot water hole, the first water outlet hole, and the second water outlet hole of the fixed valve piece such that cold water and hot water are blocked by the driving valve piece and not flow out from the water valve; and wherein the balanced valve comprises two halves of cases, and the two cases are configured to fit together to accommodate a fixed valve pipe and a valve core therebetween; each of the cases has a horizontal through hole formed at a lateral surface thereof, and the two through holes are faced to each other; each of the cases comprises a water passage penetrating from a top surface to a bottom surface of the case and communicated with the through hole; the two through holes are adapted to enable the fixed valve pipe and the valve core to be accommodated in the cases when the two halves of cases are fitted together; the balanced valve is positioned in the water inlet chamber of the base to secure the fixed valve pipe in the cases, and the two water passages of the two cases are respectively aligned with the first cold water inlet and the first hot water inlet of the base; the fixed valve pipe has an O-ring disposed thereon, and each of two lateral sides of the fixed valve pipe comprises a first recess section; each of two ends of the valve core is concaved inwardly to form a valve room, and the two valve rooms are separated by a partition; each of the two valve rooms has a second recess section formed on a surface thereof to enable the valve core to move in the fixed valve pipe along with the water pressure occurred by cold water inflow and hot water inflow, so as to change the relative position between the first recess section and the second recess section, thereby automatically balancing the water pressure in the water valve.

2. The water valve of claim 1, wherein the water valve comprises a temperature control unit which is adapted to limit the rotating angle of the valve rod.

3. The water valve of claim 1, wherein the water valve is positioned in a valve chamber of a shunt valve for use, and the shunt valve comprises a second cold water inlet, a second hot water inlet, a first water channel, and a second water channel respectively penetrating through a bottom portion of the valve chamber; the second cold water inlet and the second hot water inlet are respectively connected to cold water source and hot water source, and the first water channel and the second water channel are respectively connected to two water equipments, such that through operating the water valve, cold water, hot water, or warm water mixed from cold water and hot water is configured to flow through one of the water equipments.

4. The water valve of claim 1, wherein a detachable adapter is connected to the valve rod, and through the adapter, the valve rod is configured to connect to different types of handles.

5. The water valve of claim 1, wherein the pressure relief slot is formed in a triangle shape.

* * * * *